United States Patent
Tijl et al.

(10) Patent No.: US 7,220,116 B2
(45) Date of Patent: May 22, 2007

(54) INJECTION MOULDING MOULD PART WITH WEAR-RESISTANT COATING

(75) Inventors: Herm Adrianus Tijl, Eindhoven (NL); Marcelis Johannes Van Rijt, Asten (NL); Henricus Johanna Wijnanda Van De Mortel, Helmond (NL)

(73) Assignee: Axxicon Moulds Eindhoven B.V., HN Son (NL)

( * ) Notice: Subject to any disclaimer, the term of this patent is extended or adjusted under 35 U.S.C. 154(b) by 0 days.

(21) Appl. No.: 11/222,820

(22) Filed: Sep. 12, 2005

(65) Prior Publication Data

US 2006/0068055 A1    Mar. 30, 2006

Related U.S. Application Data

(63) Continuation-in-part of application No. PCT/NL04/00018, filed on Mar. 12, 2004.

(30) Foreign Application Priority Data

Mar. 12, 2003   (NL) .................................. 1022910

(51) Int. Cl.
     *B29D 11/00*   (2006.01)
(52) U.S. Cl. ...................... 425/542; 425/810; 425/812; 249/116

(58) Field of Classification Search ............. 249/114.1, 249/116; 425/542, 810, 812; 264/1.33
See application file for complete search history.

(56) References Cited

U.S. PATENT DOCUMENTS

| | | | | |
|---|---|---|---|---|
| 6,099,287 | A | * | 8/2000 | Higashida et al. .......... 425/190 |
| 6,238,197 | B1 | * | 5/2001 | Van Hout et al. ........... 425/168 |
| 2002/0031570 | A1 | | 3/2002 | Gabriel |
| 2003/0127775 | A1 | * | 7/2003 | McDonald .................. 264/338 |

FOREIGN PATENT DOCUMENTS

| | | |
|---|---|---|
| EP | 1 120 221 | 8/2001 |
| JP | 11-200007 | 7/1999 |
| JP | 11-240624 | 9/1999 |
| WO | WO 99/37471 | 7/1999 |

* cited by examiner

*Primary Examiner*—Donald Heckenberg
(74) *Attorney, Agent, or Firm*—Young & Thompson

(57) ABSTRACT

Injection moulding mould part consisting of a mirror and a venting ring that can be moved with respect thereto. A wear-resistant coating has been applied to the mirror and/or the interface between the two parts that can be moved with respect to one another. This coating consists of hard metal based on tungsten with a minimum thickness of 0.01 mm and more particularly with a thickness of at least 0.1 mm. This coating is applied with an HP-HVOF process (High Velocity Oxygen Fuel).

18 Claims, 2 Drawing Sheets

INJECTION MOULDING MOULD PART WITH WEAR-RESISTANT COATING

FIELD OF THE INVENTION

The present invention relates to mould parts of an injection moulding system.

BACKGROUND OF THE INVENTION

An injection mould generally comprises two mould halves between which a mould cavity is defined. Sophisticated designs which are in particular used for injection moulding of disc shaped information carriers, such as DVD's, CD's and so on, are furthermore provided with a venting ring which can be moved around one of the moulds and delimits therein an annular boundary surface of the injection mould cavity. This ring is movable so as to reduce the volume of the injection mould cavity during injection moulding, the movable ring and the base plate being made of steel and at least one of the movable ring and the base plate being provided with a wear-resistant coating at the interface between said movable ring and the base plate.

An injection moulding mould part of this type is generally known in the state of the art. The distance between the venting ring and mirror must be particularly small if not zero in order to prevent plastic getting in-between. However, the venting ring must move with respect to the mirror or base plate during each opening and closing movement.

To prevent wear, it is proposed in the state of the art to provide either the base plate or the venting ring with a wear resistant coating. This wear resistant coating is a PVD (Physical Vapour Deposition) coating, such as a DLC (Diamond Like Carbon) coating.

It has been found that this coating is adequately wear-resistant, but that it cannot be guaranteed that the PVD coating, which is a few microns thick, will continue to adhere to the steel after prolonged use.

WO99/37471 A (assigned to patentee) discloses a mould assembly wherein a wear-resistant coating is used which is either coated with TiN or DLC. TiN has a hardness of about 2000–3000 HV, whilst the hardness of DLC is even higher.

JP 10008158 discloses the use of a functional film which will not crack and is applied by the HP-HVOF method. There is no indication about the use of such film.

JP 11-240624 discloses the use of a coating based on tungsten and cobalt in a dynamic condition.

SUMMARY OF THE INVENTION

According to a first aspect of the invention it is aimed to provide a wear-resisting layer between two parts of an injection mould assembly and more particular the mirror face of an injection moulding mould part. Such surface is subjected to repeated loading of plastic material when injected during each injection step. In such dynamic conditions a coating applied should show good wear-resistance and good adherence. According to a first aspect of the invention this is realised in that such wear-resistant coating comprises a coating based on tungsten with cobalt and having a thickness of at least 0.01 mm.

According to a further aspect of the invention a coating is proposed to be provided between the venting ring and the mirror/base adjacent thereto. Although, these services are subjected to dynamic loading wherein both wear-resistance and adherence to the base surface are of importance.

According to a further aspect of the invention the wear-resistant coating comprises a coating based on tungsten with cobalt and having a thickness of at least 0.01 mm.

According to the present invention, use is no longer made of a PVD coating a few microns thick. Instead of this, hard metal based on tungsten is used and the coating thickness is chosen to be appreciably greater, being at least 0.01 mm and more particularly at least 0.1 mm. More particularly, such a wear-resistant coating is applied to both the mirror and the venting ring. Experiments have shown that such a combination has a particularly long life and does not have the problems described above which are observed with PVD coatings. Such a coating has a hardness below 1500 HV and more particular between 1000 HV.

According to an advantageous embodiment, the wear-resistant coating contains except from tungsten cobalt and nickel.

The steel used for the mirror and the venting ring preferably contains at least 10% chromium and is, of course, hardened.

Although the wear-resistant coating can be applied to the venting ring and/or the mirror in any manner known in the state of the art, according to an advantageous embodiment this is applied using the method with the so-called HP-HVOF process. HP-HVOF (High Velocity Oxygen Fuel) is a process with which a hard metal product is introduced into a gas stream, which is generated by combining oxygen and fuel in a chamber located upstream. This powder is entrained by the gas through a delivery tube and projected onto the workpiece. The fuel used can be gas or liquid fuel, such as kerosene. Gas speeds of up to 3000 m/s are achievable. With such a process it is possible to apply both material based on tungsten and non-ferrous materials, such as types of bronze.

According to the present invention, after applying the coating, the substrate treated in this way is finished by grinding in order to obtain the tight fit with the other component, being mirror or venting ring.

Other methods for producing a hard metal coating are the application of hard metal foil and/or the use of hard metal sleeves. However, it has been found that the bonding between the substrate and a hard metal is critical, and for this reason preference is given to the HP-HVOF method described above. This adhesion is critical because of the close fit between the two intrinsically moving parts and the temperature fluctuations.

DETAILED DESCRIPTION OF A PREFERRED EMBODIMENT OF THE INVENTION

Figure 1:
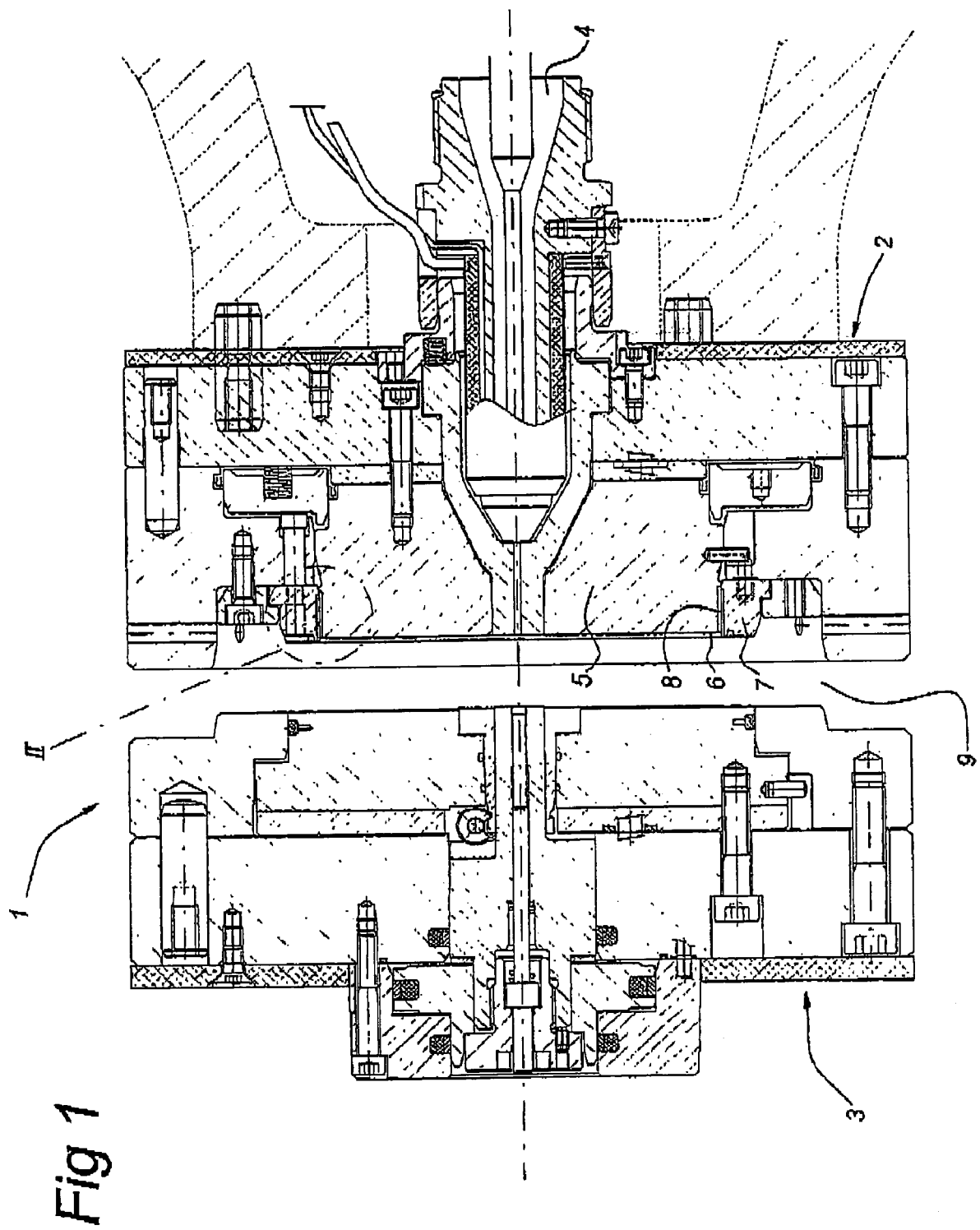
FIG. 1 shows, diagrammatically, an injection moulding mould in cross-section.

In FIG. 1 an injection moulding mould is indicated by 1. This is in particular a mould for the injection of optical information carriers such as DVDs, CDs, etc. This mould must be fitted on an injection moulding machine. The mould consists of a mould part 3 and a mould part 2. Mould part 3 is provided with the ejector pin and the like, but this will not be discussed in detail below.

Mould part 2 is coupled to the nozzle 4. On mould part 2 there is a mirror 5, the mirror surface of which is indicated by 6. Mirror surface 6 is arranged to receive a stamper (not shown). This stamper contains the related digital information.

There is a venting ring 7 on the mirror 5. This ring is fixed to mould part 2 by means of bolts. There is a free space through which the venting ring 7 can be displaced with respect to the mirror 5. The inner ring surface of the venting ring 7 is indicated by 8.

The mould cavity 9 is delimited by the mirror surface 6 and the part of the jacket surface 8 that protrudes beyond the mirror surface 6.

The venting ring moves relative to the mirror 5 during each injection cycle. This occurs for a wide variety of reasons. One of these is the post-pressing of the plastic (stamping) so as to obtain better correspondence between the stamper and the part produced by injection moulding.

The interface between the venting ring 7 and the mirror 5 is subjected to particularly severe stress. After all, the movement described above takes place during each cycle. The fit between the two parts must be close in order to prevent plastic material penetrating into the gap between them during injection.

Figure 2:
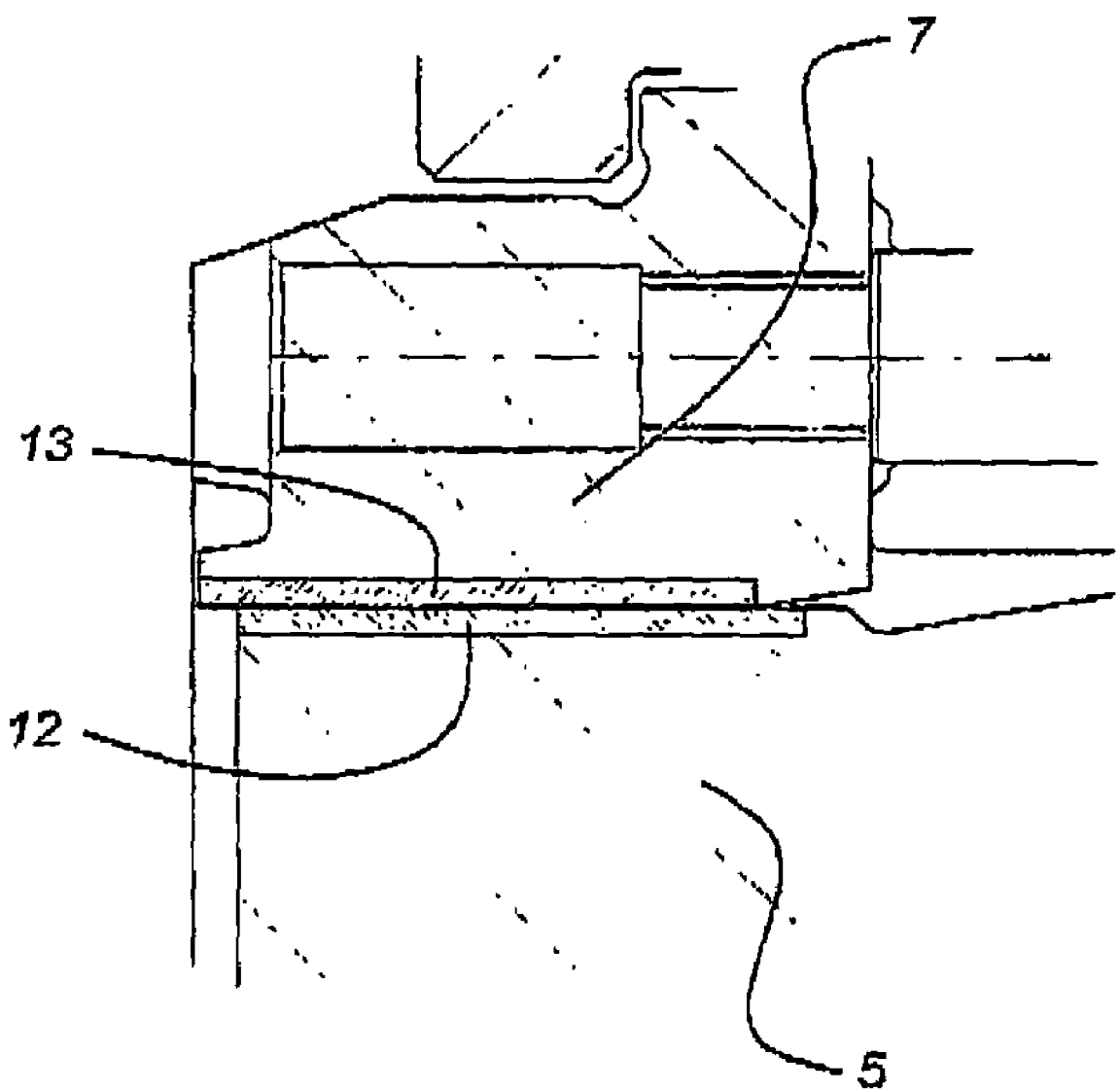
FIG. 2 shows detail II according to FIG. 1.

In order to prevent problems with regard to wear at the interface, it is proposed according to the present invention, as shown in FIG. 2, to apply a wear-resistant coating 13 and 12, respectively, to both the venting ring 7 and the mirror 5. This wear-resistant coating consists of a hard metal based on tungsten and is at least 0.1 mm thick. Apart from tungsten, nickel and cobalt, for example, are present as alloying elements. It has been found that as a result of the use of such a wear-resistant coating there is still no damage or change in tolerance between venting ring 7 and mirror 5 even after many million cycles.

The coatings 12 and 13 are preferably applied with the aid of the HP-HVOF method.

According to a further aspect of the invention the mirror face 6 is provided with a coating as described above consisting of a hard metal based on tungsten and being at least 0.1 mm thick. Through the presence of such coating wear and tear of mirror surface 6 is greatly reduced. At each injection cycle a stamper (not shown) placed on mirror surface 6 will slightly displace relative to such surface because of a hanging pressure and temperature. This movement has an extent of micrometers.

Although the invention has been described above with reference to a preferred embodiment, it will be understood by those skilled in the art that numerous variants are possible that are obvious after reading the above description and fall within the scope of the appended claims.

The invention claimed is:

1. Injection molding mold part comprising a base plate delimiting an injection mold cavity, around which a ring that can be moved with respect thereto is arranged, which ring delimits within it an annular boundary surface of said injection mold cavity, which ring can be moved so as to reduce the volume of the injection mold cavity during injection molding, the movable ring and the base plate being made of steel and at least one of the movable ring and the base plate having a wear-resistant coating at the interface between said movable ring and the base plate, the wear-resistant coating comprising a coating based on tungsten with cobalt and having a thickness of at least 0.01 mm.

2. Injection molding mold part according to claim 1, wherein said coating comprises a foil.

3. Injection molding mold part according to claim 1, wherein said wear-resistant coating is applied both to the movable ring and to the base plate.

4. Injection molding mold part according to claim 1, wherein the wear-resistant coating is applied to said base plate and extends as far as a boundary surface thereof.

5. Injection molding mold part according to claim 1, wherein said wear-resistant coating contains at least one of nickel and chromium.

6. Injection molding mold part according to claim 1, wherein said steel contains at least 10% chromium.

7. Injection molding mold part according to claim 1, wherein said wear-resistant coating is at least 0.1 mm thick.

8. Injection molding mold part according to claim 1, wherein said movable ring is fitted around said base plate such that there is essentially no play.

9. Injection molding assembly for molding disc-shaped information carriers comprising two opposite mold parts between which an injection mold cavity is defined, said mold parts being movable relative to each other for opening and closing said injection mold assembly, at least one of the injection mold parts having a mirror surface for supporting a stamper directed to the other of said mold parts, wherein said mirror surface has a wear-resisting coating comprising a coating based on tungsten with cobalt and having a thickness of at least 0.01 mm.

10. Injection molding mold assembly according to claim 9, wherein said coating comprises a foil.

11. Injection molding mold assembly according to claim 9, wherein said wear-resistant coating is applied both to the movable ring and to the base plate.

12. Injection molding mold assembly according to claim 9, wherein the wear-resistant coating is applied to said base plate and extends as far as a boundary surface thereof.

13. Injection molding mold assembly according to claim 9, wherein said wear-resistant coating contains at least one of nickel and chromium.

14. Injection molding mold assembly according to claim 9, wherein said steel contains at least 10% chromium.

15. Injection molding mold assembly according to claim 9, wherein said wear-resistant coating is at least 0.1 mm thick.

16. Injection molding mold assembly according to claim 9, wherein said movable ring is fitted around said base plate such that there is essentially no play.

17. Injection mold assembly according to claim 9, wherein a said mold part comprises a base plate delimiting an injection mold cavity, around which a ring that can be moved with respect thereto is arranged, which ring delimits within it an annular boundary surface of said injection mold cavity, which ring can be moved so as to reduce the volume of the injection mold cavity during injection molding, the movable ring and the base plate being made of steel and at least one of the movable ring and the base plate having a wear-resistant coating at the interface between said movable ring and the base plate, the wear-resistant coating comprising a coating based on tungsten with cobalt and having a thickness of at least 0.01 mm.

18. Injection molding mold part according to claim 1, having a mirror surface for supporting a stamper, wherein said mirror surface has a wear-resisting coating comprising a coating based on tungsten with cobalt and having a thickness of at least 0.01 mm.

* * * * *